United States Patent [19]

Levine

[11] 4,018,643
[45] Apr. 19, 1977

[54] METHOD OF FORMING A PACKET OF SEPARATED MICROSCOPE SLIDES

[75] Inventor: Marshall S. Levine, Wayne, Pa.

[73] Assignee: Geometric Data Corporation, Wayne, Pa.

[22] Filed: May 19, 1976

[21] Appl. No.: 688,005

[52] U.S. Cl. .................................... 156/297; 53/3
[51] Int. Cl.² ................ B32B 31/00; B65B 15/00
[58] Field of Search ............ 206/73, 455, 456, 460; 156/297, 292, 299, 300; 428/194; 53/3

[56] References Cited
UNITED STATES PATENTS

| | | |
|---|---|---|
| 1,883,113 | 10/1932 | Titchener ........................ 156/297 |
| 2,098,258 | 11/1937 | Rowe .............................. 156/297 |
| 3,042,572 | 7/1962 | Verhulst ........................... 156/297 |
| 3,303,075 | 2/1967 | Rabus .............................. 156/297 |
| 3,459,297 | 8/1969 | Templeton et al. ................ 206/73 |

*Primary Examiner*—Douglas J. Drummond
*Attorney, Agent, or Firm*—Smith, Harding, Earley & Follmer

[57] ABSTRACT

A packet of microscope slides has a length of tape. Each of a plurality of microscope slides has one side of the slide removably adhered to a portion of the tape spaced from portions of the tape to which the other slides are secured to provide a separation between adjacent slides. The packet of slides is formed by tilting a plurality of slides which are in registration with the slides in contact and parallel to each other to place one edge of each slide substantially in a common plane outside of a substantially parallel plane containing the adjacent parallel edge of the slide while retaining adjacent slides in contact. A length of tape is secured to the edges of the slides in said common plane. The slides are then straightened to separate each slide from its adjacent slide. The carrying out of the method is facilitated by the use of a jig which has a bottom, a rear wall, and a pair of opposed side walls. One side wall supports the slides when tilted. The inside of this wall makes an obtuse angle with the bottom. A second side wall has an upper portion which supports the slides when straightened. The inside of this wall makes an acute angle with the bottom which permits adjacent slides to move under the wall when tilting.

1 Claim, 13 Drawing Figures

METHOD OF FORMING A PACKET OF SEPARATED MICROSCOPE SLIDES

BACKGROUND OF THE INVENTION

Microscope slides are typically sold, for example, in lots of one-half gross packed together in a box. Frequently two slides will adhere together so tightly that they cannot be separated resulting in their being thrown away. The frequency of this occurrence is sufficient to cause substantial waste. This problem appears to be due to the fact that where two parallel clean surfaces are pressed together, all air is evacuated and the friction is extremely high. The problem appears to be accentuated if humid conditions provide a small amount of moisture between the microscope slides. Moisture is often supplied to slides from a user having moist hands. Further, the problem is accentuated by the passage of time so that manufacturers ship microscope slides as soon as they are manufactured and users make a special effort to use them as quickly as possible.

This invention solves the problem by providing a packet of separated microscope slides which can be shipped and stored for long periods of time without fear of adjacent slides becoming inseparable.

BRIEF SUMMARY OF THE INVENTION

A packet of microscope slides has a length of tape. Each of a plurality of microscope slides has one side of the slide removably adhered to a portion of the tape spaced from portions of the tape to which the other slides are secured to provide a separation between adjacent slides. The packet of slides is formed by tilting a plurality of slides which are in registration with the slides in contact and parallel to each other to place one edge of each slide substantially in a common plane outside of a substantially parallel plane containing the adjacent parallel edge of the slide while retaining adjacent slides in contact. A length of tape is secured to the edges of the slides in said common plane. The slides are then straightened to separate each slide from its adjacent slide. The carrying out of the method is facilitated by the use of a jig which has a bottom, a rear wall, and a pair of opposed side walls. One side wall supports the slides when tilted. The inside of this wall makes an obtuse angle with the bottom. A second side wall has an upper portion which supports the slides when straightened. The inside of this wall makes an acute angle with the bottom which permits adjacent slides to move under the wall when tilting.

DETAILED DESCRIPTION

Figure 4:
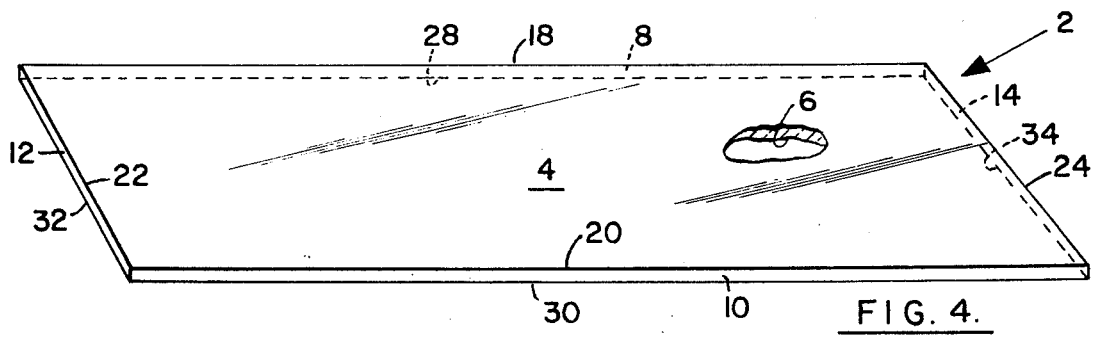
FIG. 4 is a perspective view, partially broken away, showing a typical microscope slide.

Referring first to FIG. 4, a microscope slide 2 has a face 4 and an opposed parallel face 6. It also has parallel relatively long sides 8 and 10 and parallel relatively short sides 12 and 14. Face 4 has edges 18, 20, 22 and 24 which are common respectively with sides 8, 10, 12 and 14. Similarly, face 6 has edges 28, 30, 32 and 34 which are respectively common with sides 8, 10, 12 and 14. Microscope slide 2 is conventional and will generally be made out of glass but may be made out of other suitable materials such as a synthetic resin as is well known to the art.

Figure 1:
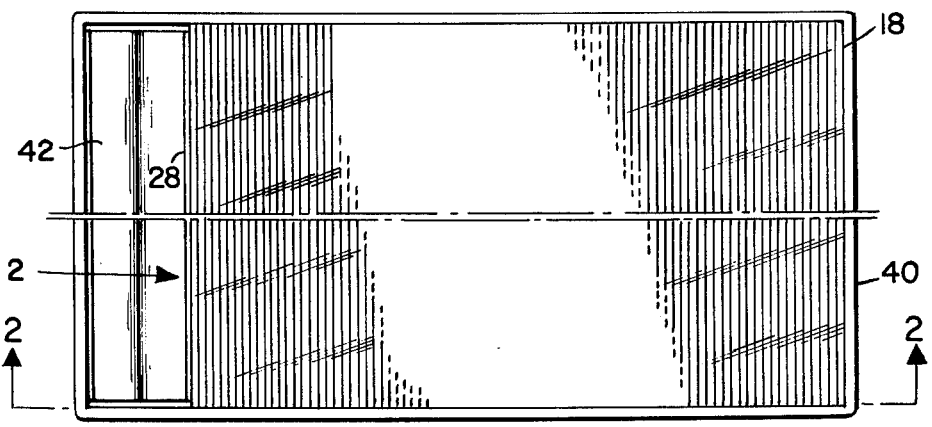
FIG. 1 is a plan view of a plurality of microscope slides in registration contained in a box.
Figure 2:
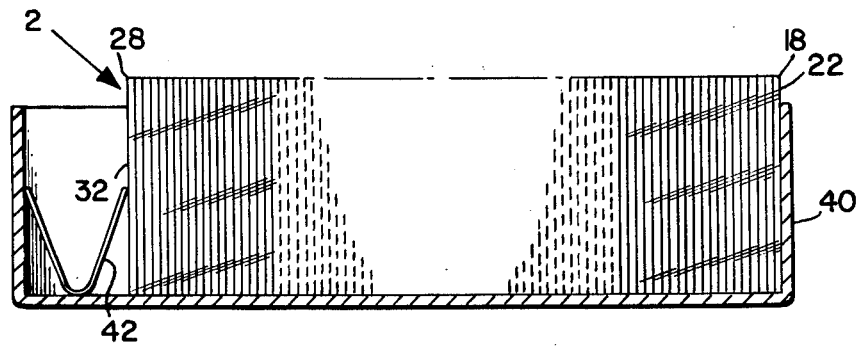
FIG. 2 is a vertical section taken on the plane indicated by the line 2—2 in FIG. 1.
Figure 3:
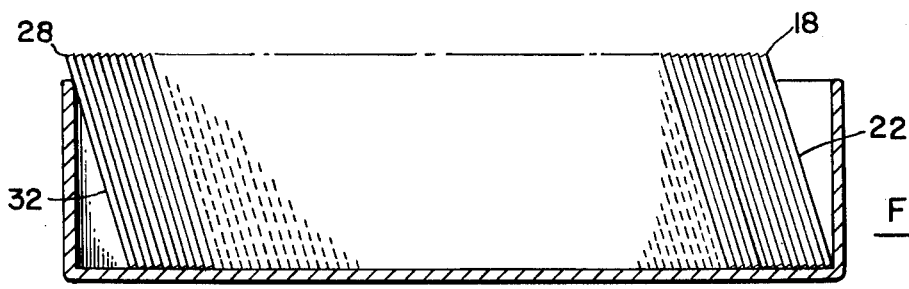
FIG. 3 is a vertical section showing the slides of FIG. 2 tilted.
Figure 5:
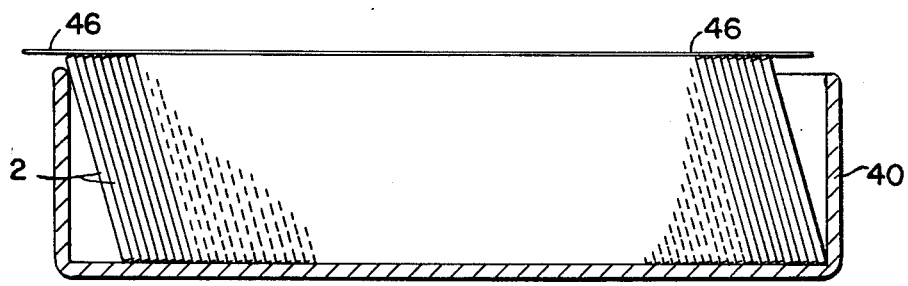
FIG. 5 is a vertical section showing the slides of FIG. 3 with a tape applied thereto.

Referring now to FIG. 1, it is conventional for microscope slides 2 to be packaged in a container 40 containing a V-shaped paper filler 42 to keep the slides tightly packed. The method of the invention can be carried out with the slides in container 40. The filler 42 is removed and the slides are tilted to the left as shown in FIG. 3. This places the edge 18 of each slide 2 above the adjacent parallel edge 28. Adhesive tape 46 is now adhered to the edges 18 of slides 2 as illustrated in FIG. 5. Referring to the enlarged view of FIG. 8, it will be seen that the tilting of the slides placed all of edges 18 substantially in a common plane which is shown as being occupied by tape 46 which as detailed above is secured to edges 18. Likewise, the tilting placed all of the edges 28 substantially in a plane indicated by the broken line 50 which is parallel to the plane of tape 46.

Figure 6:
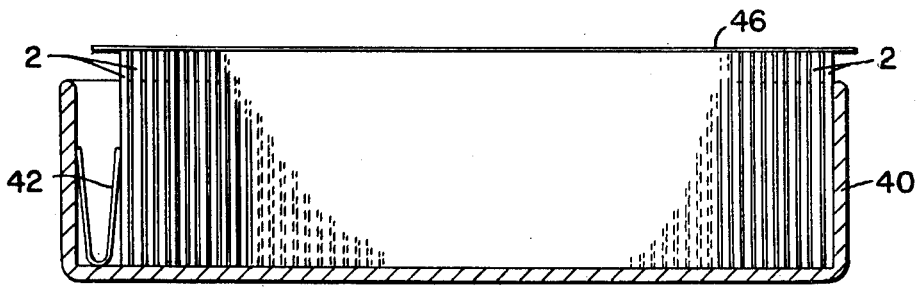
FIG. 6 is a vertical section showing the taped slides of FIG. 5 returned to a position of registration with the adjacent slides separated.
Figure 8:
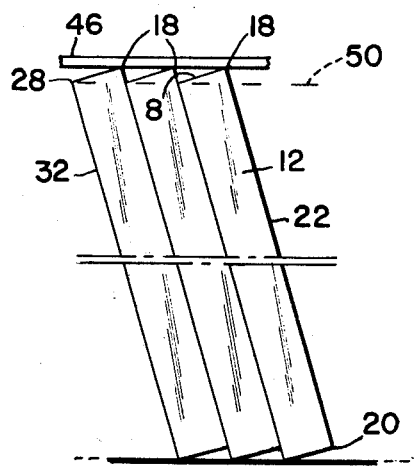
FIG. 8 is an enlarged view, partially broken away, of three of the slides of FIG. 5.
Figure 9:
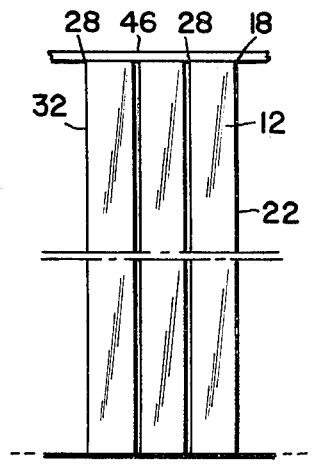
FIG. 9 is an enlarged view of the slides of FIG. 8 straightened.

The slides are now straightened to a vertical position to again place them in registration as illustrated in FIG. 6 and they can be held in this position by inserting the V-shaped filler 42 into box 40 all as illustrated in FIG. 6. This results in the spacing apart of the slides 2 as shown in FIG. 6 and better seen in the enlarged view of FIG. 9. As best seen in FIG. 8, the separation of the slides is accomplished by virtue of the fact that tape 46 holds adjacent edges 18 a fixed distance apart which is greater than the width of a slide 2, it being noted in FIG. 8 that the distance between adjacent edges 18 forms the hypotenuse of a triangle containing one side of slide 2. While the lower portions of the slides 2 are shown in FIG. 6 to be separated, the insertion of filler 42 tends to urge these lower portions together without in any way harming the separability of the slides since their upper portions remain separated.

Figure 7:
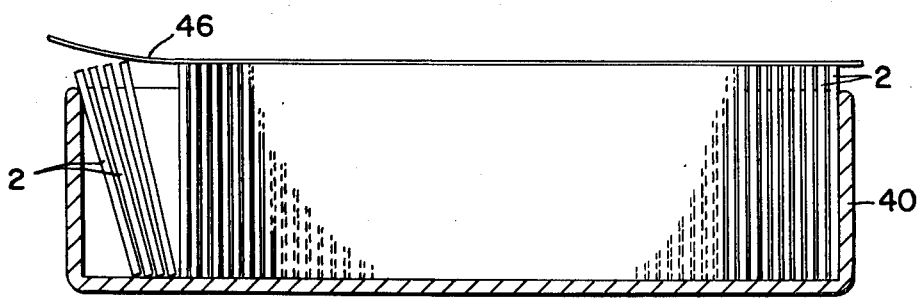
FIG. 7 is a vertical section of the slides of FIG. 6 showing a portion of the tape removed.

The slides having been separated, they will be retained in the separated condition by virtue of the tape being secured to the faces 8 of the slides when they are straightened to the vertical position. As illustrated in FIG. 7, the tape can be stripped progressively releasing the slides for use when desired. If all of the slides are to be used relatively promptly, the tape 46 may be stripped of all of the slides at one time.

Figure 10:
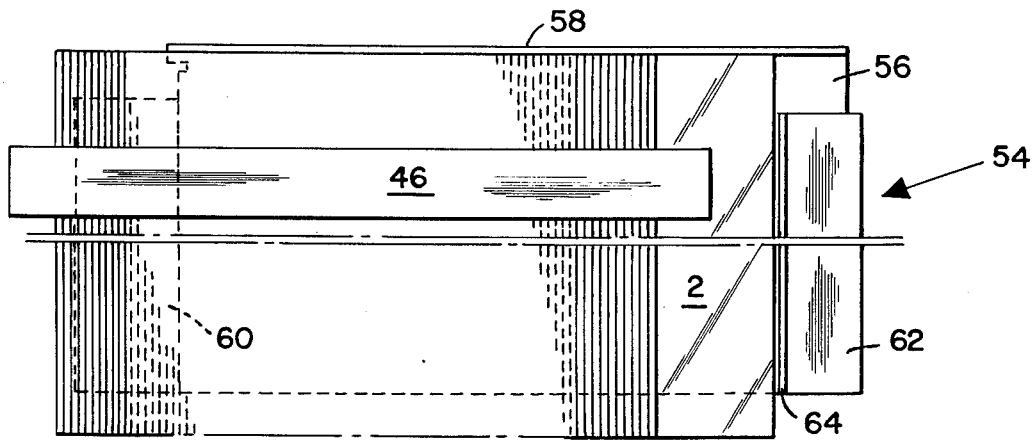
FIG. 10 is a plan view of a jig for use in carrying out the method of the invention containing tilted slides with a tape applied thereto.
Figure 11:
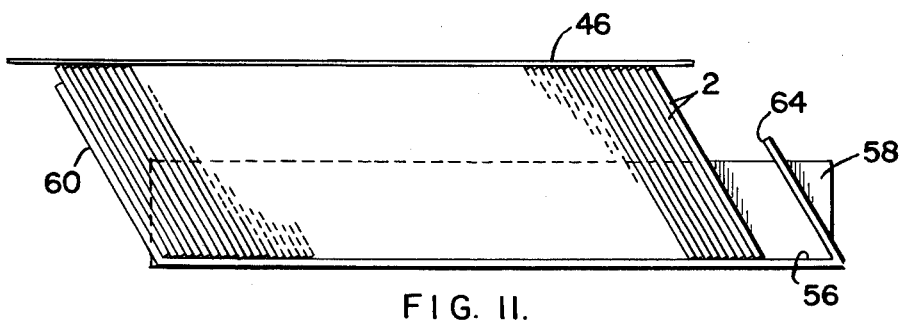
FIG. 11 is a front elevation of the jig of FIG. 10.
Figure 12:
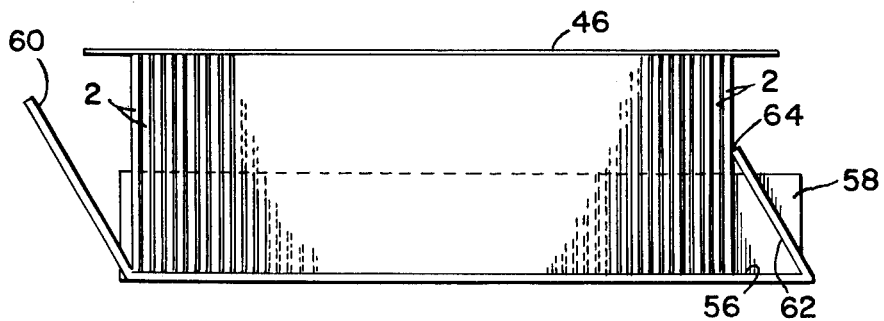
FIG. 12 is a front elevation of the jig of FIG. 10 showing the slides straightened to a position of registration.

Referring now to FIG. 10 an advantageous jig 54 for carrying out the method of the invention has a bottom 56, a substantially vertical rear wall 58, a sloping left side wall 60 and a sloping right side wall 62. Wall 60 is placed at a convenient obtuse angle with the bottom 56 for the support of the left hand slide 2 when the slides are tilted. The upper end 64 of wall 62 supports the right hand slide 2 when the slides are initially placed in the jig 54 and again acts as a support when the slides are straightened to the vertical position after the tape 46 has been placed on the edges 18. The inside of wall 62 forms an acute angle with the bottom 56 to permit the adjacent slides to move under wall 60 when they are tilted which facilitates placing the slides in their tilted position. After the slides have been formed into the packet shown in FIG. 12 they can be removed and placed into another container for immediate use or for shipment or the like.

Figure 13:
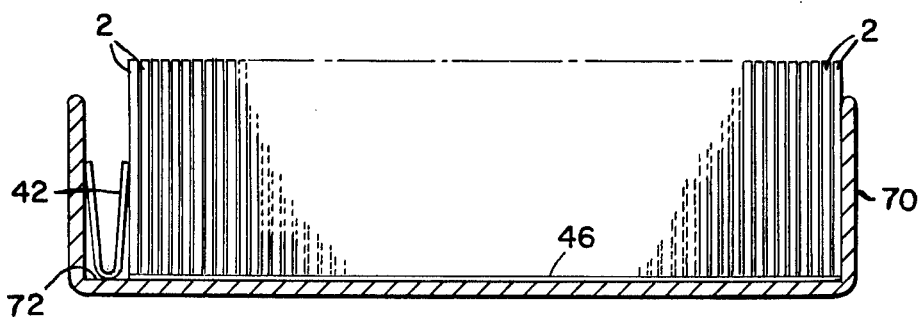
FIG. 13 is a side elevation of the slides of FIG. 12 in a box which is broken away.

Referring to FIG. 13, the slides 2 secured in spaced relation by tape 46 may be placed in a box 70 with the tape 46 against the bottom 72 of the box. As shown, the ends of the tape 46 are trimmed off where they extend beyond the slides. This arrangement is advantageous since the portion of the tape from which slides 2 have been removed remains neatly out of the users way inside the box 70 and the tape need not be manipulated for the removal of a slide which is accomplished by simply grasping the slide and pulling it free of the tape.

It will be understood that the above embodiments are illustrative and are not intended to be limiting.

I claim:

1. The method of forming a packet of separated microscope slides comprising:
    tilting a plurality of microscope slides which are in registration with adjacent slides in contact and parallel to each other to place one edge of each slide substantially in a common plane outside of a substantially parallel plane containing the adjacent parallel edge of the slide while retaining adjacent slides in contact,
    securing a length of tape to the edges of the slides in said common plane, and
    straightening the slides to separate each slide from its adjacent slides.

* * * * *